United States Patent
Lee

(10) Patent No.: US 12,417,330 B2
(45) Date of Patent: Sep. 16, 2025

(54) METHOD OF VERIFYING SEMICONDUCTOR DEVICE, METHOD OF DESIGNING AND MANUFACTURING SEMICONDUCTOR DEVICE USING THE SAME, AND SYSTEM PERFORMING THE SAME

(71) Applicant: SAMSUNG ELECTRONICS CO., LTD., Suwon-si (KR)

(72) Inventor: Junro Lee, Gunpo-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 592 days.

(21) Appl. No.: 17/851,842

(22) Filed: Jun. 28, 2022

(65) Prior Publication Data
US 2023/0106989 A1 Apr. 6, 2023

(30) Foreign Application Priority Data
Oct. 1, 2021 (KR) .................. 10-2021-0130609

(51) Int. Cl.
*G06F 30/327* (2020.01)
*G06F 30/331* (2020.01)
*G06F 30/3315* (2020.01)
*G06F 119/06* (2020.01)

(52) U.S. Cl.
CPC .......... *G06F 30/327* (2020.01); *G06F 30/331* (2020.01); *G06F 30/3315* (2020.01); *G06F 2119/06* (2020.01)

(58) Field of Classification Search
USPC ........................................ 716/111
See application file for complete search history.

(56) References Cited

U.S. PATENT DOCUMENTS

| | | | |
|---|---|---|---|
| 7,076,753 B2 * | 7/2006 | Cerny | G06F 30/3323 703/16 |
| 7,669,165 B2 | 2/2010 | Pandey et al. | |
| 8,176,453 B2 | 5/2012 | Yang et al. | |
| 8,516,422 B1 | 8/2013 | Wang et al. | |
| 9,058,440 B1 | 6/2015 | Kolpekwar | |
| 10,783,307 B1 | 9/2020 | Kukal et al. | |
| 10,789,406 B1 * | 9/2020 | Raja | G06F 30/3323 |
| 2002/0007261 A1 | 1/2002 | Ochi et al. | |

FOREIGN PATENT DOCUMENTS

JP 4120931 B2 7/2008

* cited by examiner

*Primary Examiner* — Bryce M Aisaka
(74) *Attorney, Agent, or Firm* — Sughrue Mion, PLLC

(57) ABSTRACT

In a method of verifying a semiconductor device, input data defining the semiconductor device including a plurality of blocks is received. A first simulation environment is generated for a top module and at least one target block of the plurality of blocks in the top module. The first simulation environment includes power wiring information and additional power-related information. The top module represents an entire structure of the semiconductor device. A second simulation environment is generated for non-target blocks of the plurality of blocks other than the at least one target block. The second simulation environment is different from the first simulation environment. A verification operation is performed on the semiconductor device based on a hybrid simulation environment in which the first simulation environment and the second simulation environment are combined.

18 Claims, 16 Drawing Sheets

METHOD OF VERIFYING SEMICONDUCTOR DEVICE, METHOD OF DESIGNING AND MANUFACTURING SEMICONDUCTOR DEVICE USING THE SAME, AND SYSTEM PERFORMING THE SAME

CROSS-REFERENCE TO RELATED APPLICATION

This application claims priority under 35 U.S.C. § 119 to Korean Patent Application No. 10-2021-0130609 filed on Oct. 1, 2021 in the Korean Intellectual Property Office, the contents of which are incorporated by reference herein in their entirety.

BACKGROUND

1. Technical Field

Example embodiments of the present disclosure relate generally to semiconductor integrated circuits, and more particularly, to methods of verifying semiconductor devices performed when designing the semiconductor devices, methods of designing and manufacturing semiconductor devices using the methods of verifying the semiconductor devices, and systems performing the methods of verifying and/or designing the semiconductor devices.

2. Description of Related Art

A semiconductor device may be manufactured by patterning devices and mutual connections thereof on a substrate such as a semiconductor wafer. A semiconductor device may be manufactured through a process in which a designer designs an integrated circuit using an electronic design automation (EDA), which enables various circuit components to be placed to interact with each other and to be connected to each other. In other words, a layout designer may generate a layout and physical design of a semiconductor device using the EDA.

As the degree of integration of semiconductor devices increases, the features or characteristics requiring verification, which is performed when designing the semiconductor devices, may also increase. In addition, as the life cycle of semiconductor devices decreases, the development schedule of the semiconductor devices may be shortened. Since more features need to be verified in a shorter time, accurate, efficient and fast verification has been required.

SUMMARY

One or more example embodiments of the present disclosure provide a method of verifying a semiconductor device capable of accurately, quickly and efficiently checking whether a power wiring is normally connected and/or whether a power switch is normally operating when designing the semiconductor device.

Further, one or more example embodiments of the present disclosure provide a method of designing a semiconductor device and a method of manufacturing a semiconductor device using the method of verifying the semiconductor device.

Further still, one or more example embodiments of the present disclosure provide a system performing the method of verifying the semiconductor device and/or the method of designing the semiconductor device.

According to an aspect of an example embodiment, there is provided a method of verifying a semiconductor device including a plurality of blocks, the method including: receiving input data defining the semiconductor device; generating a first simulation environment for a top module and at least one target block of the plurality of blocks in the top module, the first simulation environment including power wiring information and additional power-related information, the top module representing an entire structure of the semiconductor device; generating a second simulation environment for non-target blocks of the plurality of blocks other than the at least one target block, the second simulation environment being different from the first simulation environment; and performing a verification operation on the semiconductor device based on a hybrid simulation environment in which the first simulation environment and the second simulation environment are combined.

According to an aspect of an example embodiment, there is provided a system of verifying a semiconductor device including a plurality of blocks, the system including: a storage device configured to store information including procedures; and a processor configured to access the storage device and to execute the procedures, wherein the procedures include a verification module configured to: receive input data defining the semiconductor device, generate a first simulation environment for a top module and at least one target block of the plurality of blocks in the top module, the first simulation environment including power wiring information and additional power-related information, the top module representing an entire structure of the semiconductor device, generate a second simulation environment for non-target blocks of the plurality of blocks other than the at least one target block, the second simulation environment being different from the first simulation environment, and perform a verification operation on the semiconductor device based on a hybrid simulation environment in which the first simulation environment and the second simulation environment are combined.

According to an aspect of an example embodiment, there is provided a method of designing a semiconductor device including a plurality of blocks, the method including: performing a gate level design of the semiconductor device; and performing a first verification on the semiconductor device on which the gate level design is completed, wherein performing the first verification includes: receiving input data defining the semiconductor device; generating a first simulation environment for a top module and at least one target block of the plurality of blocks in the top module, the first simulation environment including power wiring information and additional power-related information, the top module representing an entire structure of the semiconductor device; generating a second simulation environment for non-target blocks of the plurality of blocks other than the at least one target block, the second simulation environment being different from the first simulation environment; and performing a verification operation on the semiconductor device based on a hybrid simulation environment in which the first simulation environment and the second simulation environment are combined.

According to an aspect of an example embodiment, there is provided a method of verifying a semiconductor device including a plurality of blocks, the method including: receiving input data defining the semiconductor device, each of the plurality of blocks including at least one sub intellectual property (sub-IP); generating a power-gating netlist (PG-NET) simulation environment for a top module and at least one target block of the plurality of blocks in the top module, the PGNET simulation environment including at least one of power port information, power switch information, external power buffer information, and memory power information, the top module representing an entire structure of the semiconductor device; generating a register transfer level (RTL) simulation environment for non-target blocks of the plurality of blocks other than the at least one target block, the RTL simulation environment being without the power port information, the power switch information, the external power buffer information, and the memory power information; and performing a verification operation on the semiconductor device based on a hybrid simulation environment in which the PGNET simulation environment and the RTL simulation environment are combined, wherein generating the PGNET simulation environment includes: setting the top module and the at least one target block as PGNET blocks; and setting a first sub-IP included in the at least one target block as a power-aware design kit (PA_DK) using a first library, and wherein generating the RTL simulation environment includes: setting the non-target blocks as RTL blocks; automatically generating a plurality of fake power ports for each of the RTL blocks; and setting a second sub-IP included in the non-target blocks as a non-power-aware design kit (NPA_DK) using a second library that is different from the first library.

According to an aspect of an example embodiment, there is provided a method of manufacturing a semiconductor device including a plurality of blocks, the method including: designing the semiconductor device; and fabricating the semiconductor device based on a result of the designing the semiconductor device, wherein the designing the semiconductor device includes: performing a gate level design of the semiconductor device, and performing a first verification on the semiconductor device on which the gate level design is completed, and wherein the performing the first verification includes: receiving input data defining the semiconductor device, generating a first simulation environment for a top module and at least one target block of the plurality of blocks in the top module, the first simulation environment including power wiring information and additional power-related information, the top module representing an entire structure of the semiconductor device; generating a second simulation environment for non-target blocks of the plurality of blocks other than the at least one target block, the second simulation environment being different from the first simulation environment; and performing a verification operation on the semiconductor device based on a hybrid simulation environment in which the first simulation environment and the second simulation environment are combined.

In the method of verifying the semiconductor device, the method of designing the semiconductor device, the method of manufacturing the semiconductor device, and the system according to example embodiments, the verification operation may be performed on the semiconductor device based on the hybrid simulation environment in which the first simulation environment (e.g., the PGNET simulation environment) and the second simulation environment (e.g., the RTL simulation environment) are combined or mixed. When it is desired to perform the PGNET simulation on a specific block included in the semiconductor device, all blocks may not need to be implemented with the PGNET blocks. Instead, only the specific block and blocks for an operation of the specific block may be implemented with the PGNET blocks having relatively complex structures, and the remaining blocks may be implemented with the RTL blocks having relatively simple structures. Accordingly, the power-related functions, features and/or characteristics of the semiconductor device may be quickly and efficiently checked while the intended operation of the actually designed semiconductor device is maintained, and the accurate, efficient and fast verification may be performed.

BRIEF DESCRIPTION OF THE DRAWINGS

Illustrative, non-limiting example embodiments will be more clearly understood from the following detailed description taken in conjunction with the accompanying drawings, in which.

DETAILED DESCRIPTION

Figure 1:
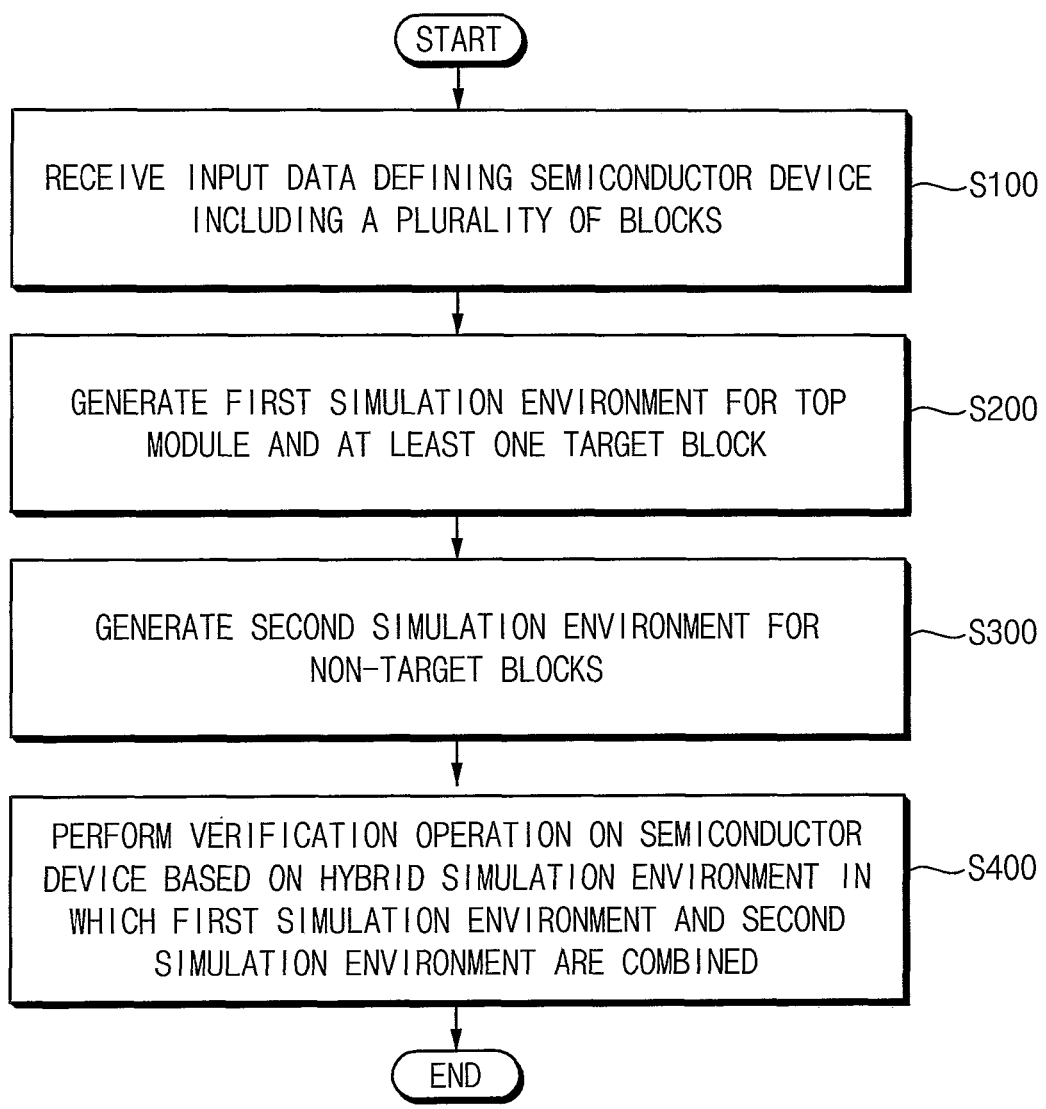
FIG. 1 is a flowchart illustrating a method of verifying a semiconductor device according to example embodiments.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

Figure 2:
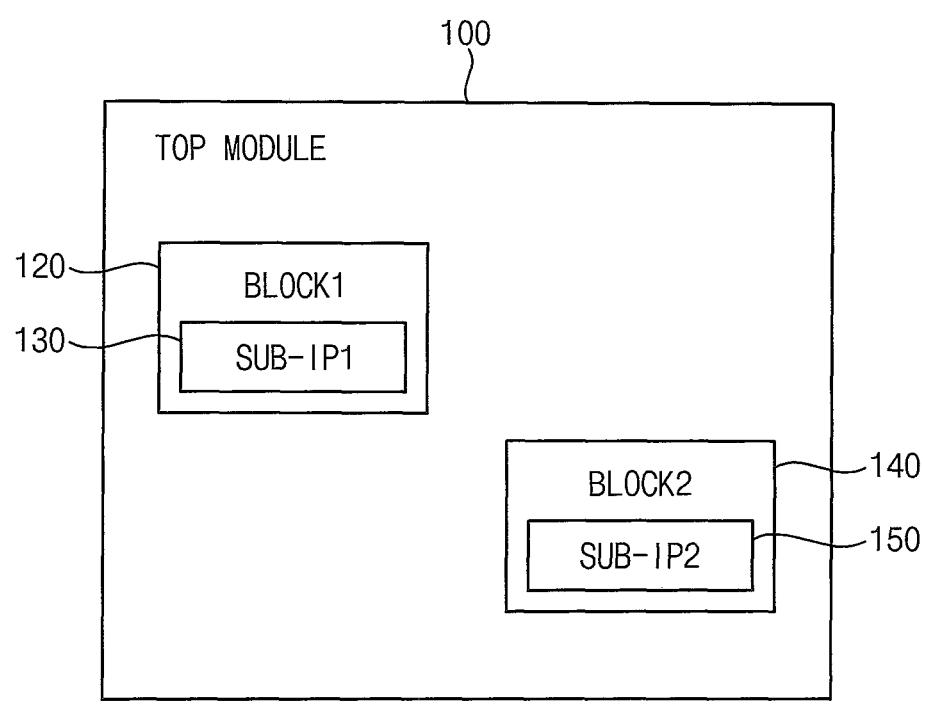
FIGS. 2, 3A and 3B are diagrams for describing a method of verifying a semiconductor device according to example embodiments.
Figure 3A:
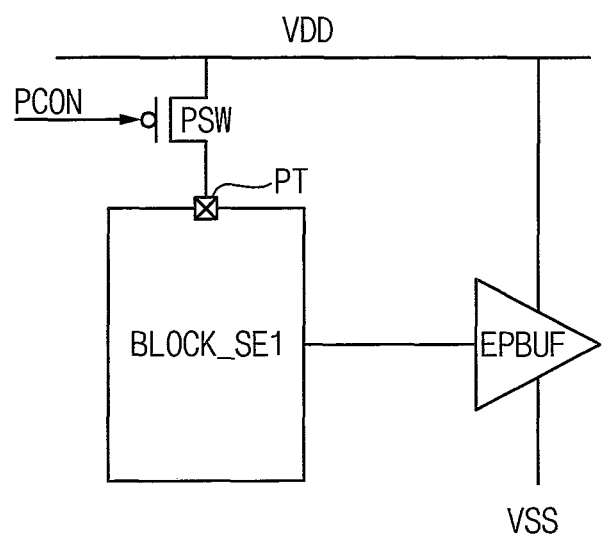
Figure 3B:
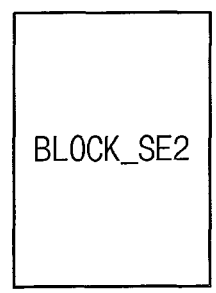

FIG. 1 is a flowchart illustrating a method of verifying a semiconductor device according to example embodiments. FIGS. 2, 3A and 3B are diagrams for describing a method of verifying a semiconductor device according to example embodiments.

Referring to FIGS. 1, 2, 3A and 3B, a method of verifying a semiconductor device according to example embodiments may be performed during a design process of the semiconductor device, and may be performed to check and/or verify power-related functions, features and/or characteristics of the semiconductor device. In addition, the method of verifying the semiconductor device according to example embodiments may be performed on a system and/or a tool for verifying and/or designing the semiconductor device. For example, the system and/or the tool for verifying and/or designing the semiconductor device may be a program including a plurality of instructions executed by a processor. The system and/or the tool will be described with reference to FIGS. 4 and 5.

In the method of verifying the semiconductor device according to example embodiments, input data defining the semiconductor device (or integrated circuit) is received (S100). The semiconductor device includes a plurality of blocks. In addition, each of the plurality of blocks may include at least one sub intellectual property (sub-IP).

In some example embodiments, the input data may be data generated from an abstract form with respect to behavior of the semiconductor device. For example, the input data may be defined in a register transfer level (RTL) through synthesis. For example, the input data may be a bitstream or netlist that is generated by synthesizing the semiconductor device defined by a hardware description language (HDL) such as VHSIC hardware description language (VHDL) or Verilog. For example, the input data may be data synthesized in a gate level using an independent language such as a Unified Power Format (UPF).

For example, as illustrated in FIG. 2, a semiconductor device 10 may include a top module 100 and a plurality of blocks 120 and 140 that are different from each other and are included in the top module 100. As the semiconductor device 10 is highly integrated, it may be difficult to design the entire semiconductor device 10 at one time, and thus the semiconductor device 10 may be designed by dividing the semiconductor device 10 into the plurality of blocks 120 and 140, by separately designing each of the blocks 120 and 140, and by integrating the designed blocks 120 and 140. When the plurality of blocks 120 and 140 are divided depending on their functions, the plurality of blocks 120 and 140 may be referred to as a plurality of functional blocks. The top module 100 may be a block representing the entire or overall structure of the semiconductor device 10, and may be referred to as the entire module or block in which the plurality of blocks 120 and 140 are integrated.

The plurality of blocks 120 and 140 may include a plurality of sub-IPs 130 and 150. For example, a first block 120 may include a first sub-IP 130, and a second block 140 may include a second sub-IP 150. A sub-IP (or simply IP) may represent a functional circuit block (or logic circuit block) predefined to be implemented in a semiconductor device, in some cases the function may be parameterized. For example, such functions may include analog or digital physical library functions, basic blocks such as counters or multiplexers, system level blocks, which are also known as cores or virtual components, or the like.

For convenience of illustration, FIG. 2 illustrates that the semiconductor device 10 includes two blocks and each block includes only one sub-IP. However, embodiments are not limited thereto, and the number of blocks and sub-IPs included in the semiconductor device 10 may be changed according to embodiments.

A first simulation environment is generated, formed, built or established for a top module and at least one target block (S200). As described with reference to FIG. 2, the top module represents the entire structure of the semiconductor device. The at least one target block is a block among the plurality of blocks in the top module, and is included in the plurality of blocks. The first simulation environment includes power wiring information and additional power-related information for each block. For example, the first simulation environment may be implemented such that each block has a relatively complex structure and configuration.

In some example embodiments, the additional power-related information may include at least one of power port information, power switch information, external power (EP) buffer information and memory power information, and the first simulation environment may be a power-gating netlist (PGNET) simulation environment. In other words, the first simulation environment may represent an environment capable of performing a power-aware simulation, and may represent a relatively complex and detailed simulation environment in which not only basic power wirings but also actual power ports, power switches, external power buffers, or the like, are inserted and internal memory power is connected.

For example, with respect to a block BLOCK_SE1 of FIG. 3A that is included in the first simulation environment, a power port PT for receiving power such as a power supply voltage VDD may be generated, a power switch PSW for supplying the power supply voltage VDD to the power port PT based on a power control signal PCON may be inserted, an external power buffer EPBUF that operates based on the power supply voltage VDD and a ground voltage VSS and is connected to the block BLOCK_SE1 may be inserted, and memory power associated with or related to the block BLOCK_SE1 and/or within the block BLOCK_SE1 may be connected. For example, in step S200, the top module 100 and the first block 120 in FIG. 2 may be set to have the same structure and configuration as the block BLOCK_SE1 of FIG. 3A. For example, the block BLOCK_SE1 of FIG. 3A may be a PGNET block.

A second simulation environment is generated, formed, built or established for non-target blocks (S300). The non-target blocks are blocks among the plurality of blocks in the top module, and are included in the plurality of blocks and other than the at least one target block. The second simulation environment is different from the first simulation environment. For example, the second simulation environment may be implemented such that each block has a relatively simple structure and configuration (e.g., has a simple structure and configuration compared to the first simulation environment). For example, the second simulation environment may not include the additional power-related information for each block.

In some example embodiments, the second simulation environment may be a register transfer level (RTL) simulation environment without the additional power-related information. In other words, the second simulation environment may represent an environment in which a power-aware simulation may not be performed, or may represent a simple and schematic simulation environment in which only basic power wirings may be checked even when the power-aware simulation is performed. For example, the basic power wirings may be checked when the power-aware simulation is performed using RTL and UPF.

For example, unlike that illustrated in FIG. 3A, with respect to a block BLOCK_SE2 of FIG. 3B that is included in the second simulation environment, the power port PT may not be generated, the power switch PSW may not be inserted, the external power buffer EPBUF may not be inserted, and the memory power may not be connected. For example, in step S300, the second block 140 in FIG. 2 may be set to have the same structure and configuration as the block BLOCK_SE2 of FIG. 3B. For example, the block BLOCK_SE2 of FIG. 3B may be an RTL block.

In some example embodiments, steps S200 and S300 may be sequentially performed. In other example embodiments, steps S200 and S300 may be substantially simultaneously or concurrently performed. Examples of steps S200 and S300 will be described in detail with reference to FIGS. 6 through 17.

A verification operation on the semiconductor device is performed based on a hybrid simulation environment in which the first simulation environment and the second simulation environment are combined or mixed (S400). In other words, the verification operation may be performed in a state in which only the top module and the at least one target block are set to the first simulation environment and the non-target blocks are set to the second simulation environment.

In some example embodiments, the verification operation may represent an operation of checking and/or verifying the power-related functions, features and/or characteristics of the semiconductor device. For example, the verification operation may include an operation of checking and/or verifying whether power wirings in the semiconductor device are normally connected, an operation of checking and/or verifying whether power switches normally operate, or the like. For example, the verification operation may be performed by considering only power-related information of the semiconductor device without considering timing-related information of the semiconductor device.

In some example embodiments, the verification operation may be performed by performing a simulation on the semiconductor device using a simulation tool. For example, the simulation tool may include an XCELIUM tool from Cadence Design Systems, Inc., or a VCS tool from Synopsys, Inc. However, example embodiments are not limited thereto.

In some example embodiments, the semiconductor device may be or include a system-on-chip (SoC).

In some example embodiments, as will be described with reference to FIG. 18, a process of designing the semiconductor device such as the SoC may be performed in an order of a behavior level design, an RTL design, a gate level design, and a layout level design. The method of verifying the semiconductor device according to example embodiments may be performed after the gate level design is performed to verify the semiconductor device on which the gate level design is completed.

In the method of verifying the semiconductor device according to example embodiments, the verification operation may be performed on the semiconductor device based on the hybrid simulation environment in which the first simulation environment (e.g., the PGNET simulation environment) and the second simulation environment (e.g., the RTL simulation environment) are combined or mixed. When it is desired to perform the PGNET simulation on a specific block included in the semiconductor device, all blocks may not need to be implemented with the PGNET blocks. Instead, only the specific block and blocks for an operation of the specific block may be implemented with the PGNET blocks having relatively complex structures, and the remaining blocks may be implemented with the RTL blocks having relatively simple structures. Accordingly, the power-related functions, features and/or characteristics of the semiconductor device may be quickly and efficiently checked while the intended operation of the actually designed semiconductor device is maintained, and the accurate, efficient and fast verification may be performed.

Figure 4:
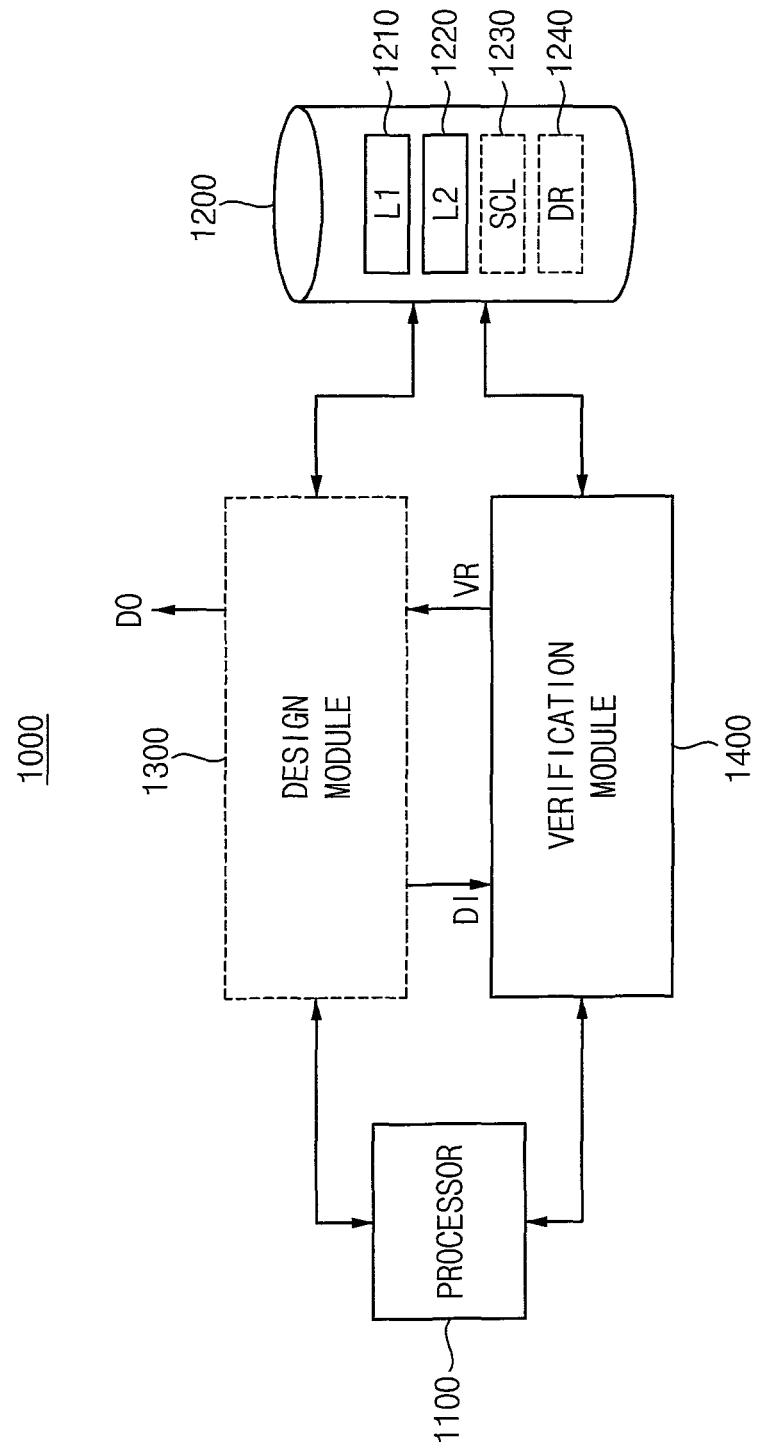
FIGS. 4 and 5 are block diagrams illustrating a system according to example embodiments.
Figure 5:
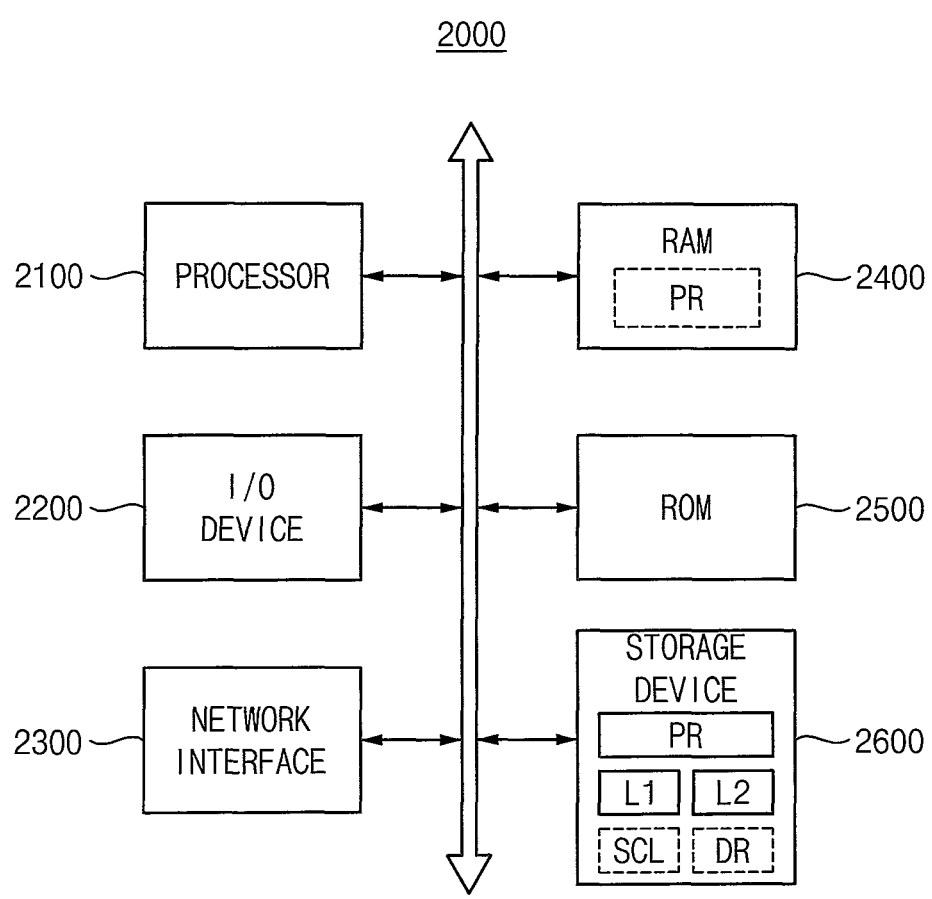

FIGS. 4 and 5 are block diagrams illustrating a system according to example embodiments.

Referring to FIG. 4, a system 1000 includes a processor 1100, a storage device 1200 and a verification module 1400. The system 1000 may further include a design module 1300.

Herein, the term "module" may indicate, but is not limited to, a software and/or hardware component, such as a field programmable gate array (FPGA) or an application specific integrated circuit (ASIC), which performs certain tasks. A module may be configured to reside in a tangible addressable storage medium and be configured to execute on one or more processors. For example, a "module" may include components such as software components, object-oriented software components, class components and task components, and processes, functions, Routines, segments of program code, drivers, firmware, microcode, circuitry, data, databases, data structures, tables, arrays, and variables. A "module" may be divided into a plurality of "modules" that perform detailed functions.

The processor 1100 may be utilized when the verification module 1400 and/or the design module 1300 perform computations or calculations. For example, the processor 1100 may include a microprocessor, an application processor (AP), a central processing unit (CPU), a digital signal processor (DSP), a graphic processing unit (GPU), or the like. In FIG. 4, only one processor 1100 is illustrated, but example embodiments are not limited thereto. For example, a plurality of processors may be included in the system 1000. In addition, the processor 1100 may include cache memories to increase computation capacity.

The storage device 1200 may include a first library (L1) 1210 and a second library (L2) 1220, and may further include a standard cell library (SCL) 1230 and a design rule (DR) 1240. The first library 1210 and the second library 1220 may be provided from the storage device 1200 to the verification module 1400, and the standard cell library 1230 and the design rule 1240 may be provided from the storage device 1200 to the design module 1300.

The first library 1210 and the second library 1220 may be used to perform the method of verifying the semiconductor device according to example embodiments described with reference to FIG. 1. Operations using the first library 1210 and the second library 1220 will be described with reference to FIGS. 15 through 17.

The standard cell library 1230 and the design rule 1240 may be used to perform a method of designing a semiconductor device according to example embodiments, which will be described with reference to FIG. 18. For example, the standard cell library 1230 and the design rules 1240 may be used in a layout level design.

In some example embodiments, the storage device (or storage medium) 1200 may include any non-transitory computer-readable storage medium used to provide commands and/or data to a computer. For example, the non-transitory computer-readable storage medium may include a volatile memory such as a static random access memory (SRAM), a dynamic random access memory (DRAM), or the like, and a nonvolatile memory such as a flash memory, a magnetic random access memory (MRAM), a phase-change random access memory (PRAM), a resistive random access memory (RRAM), or the like. The non-transitory computer-readable storage medium may be inserted into the computer, may be integrated in the computer, or may be coupled to the computer through a communication medium such as a network and/or a wireless link.

The verification module 1400 may verify, using the processor 1100, power-related functions, features and/or characteristics of a semiconductor device based on input data DI defining the semiconductor device including a plurality of blocks. As described with reference to FIG. 1, the verification module 1400 may generate a first simulation environment, which includes power wiring information and additional power-related information, for a top module and at least one target block of the semiconductor device, may generate a second simulation environment, which is different from the first simulation environment, for non-target blocks of the semiconductor device, and may perform a verification operation on the semiconductor device based on a hybrid simulation environment in which the first simulation environment and the second simulation environment are combined. The verification module 1400 may generate result data VR representing a result of the verification operation.

In some example embodiments, when the system 1000 includes both the design module 1300 and the verification module 1400, the input data DI may be provided from the design module 1300, and the result data VR may be provided to the design module 1300. In other example embodiments, when the system 1000 includes only the verification module 1400, the input data DI may be provided from an outside (e.g., an external design system), and the result data VR may be provided to the outside.

The design module 1300 may generate the input data DI to define the semiconductor device and the plurality of blocks. For example, the design module 1300 may perform a gate level design, which will be described with reference to FIG. 18, and may further perform at least one of a behavior level design, an RTL design and a layout level design.

When the verification operation is not successfully completed or is failed, the design module 1300 may perform a design change on the semiconductor device and some of the plurality of blocks. When the verification operation is successfully completed, and/or when the design of the semiconductor device is successfully completed, the design module 1300 may generate output data DO defining the semiconductor device.

In some example embodiments, when the system 1000 includes both the design module 1300 and the verification module 1400, the system 1000 may be referred to as a design/verification system or a system of designing/verifying a semiconductor device. In other example embodiments, when the system 1000 includes only the verification module 1400, the system 1000 may be referred to as a verification system or a system of verifying a semiconductor device.

In some example embodiments, the design module 1300 and the verification module 1400 may be implemented as a single integrated module. In other example embodiments, the design module 1300 and the verification module 1400 may be implemented as separate and different modules.

The designing module 1300 and/or the verification module 1400 may be implemented in software, but example embodiments are not limited thereto. When both the designing module 1300 and the verification module 1400 are implemented in software, the designing module 1300 and the verification module 1400 may be stored in the form of code in the storage device 1200, or may be stored in the form of code in another storage device separate from the storage device 1200.

Referring to FIG. 5, a system 2000 includes a processor 2100, an input/output (I/O) device 2200, a network interface 2300, a random access memory (RAM) 2400, a read only memory (ROM) 2500 and a storage device 2600. FIG. 5 illustrates an example where both the design module 1300 and the verification module 1400 in FIG. 4 are implemented in software.

The system 2000 may be a computing system. For example, the computing system may be a fixed computing system such as a desktop computer, a workstation or a server, or may be a portable computing system such as a laptop computer.

The processor 2100 may be substantially the same as the processor 1100 in FIG. 4. For example, the processor 2100 may include a core or a processor core for executing an arbitrary instruction set (for example, intel architecture-32 (IA-32), 64-bit extension IA-32, x86-64, PowerPC, Sparc, MIPS, ARM, IA-64, etc.). For example, the processor 2100 may access a memory (e.g., the RAM 2400 or the ROM 2500) through a bus, and may execute instructions stored in the RAM 2400 or the ROM 2500. As illustrated in FIG. 5, the RAM 2400 may store a program PR corresponding to the design module 1300 and/or the verification module 1400 in FIG. 4 or at least some elements of the program PR, and the program PR may allow the processor 2100 to perform operations of verifying and/or designing a semiconductor device.

In other words, the program PR may include a plurality of instructions and/or procedures executable by the processor 2100, and the plurality of instructions and/or procedures included in the program PR may allow the processor 2100 to perform the method of verifying and/or designing the semiconductor device according to example embodiments. Each of the procedures may denote a series of instructions for performing a certain task. A procedure may be referred to as a function, a routine, a subroutine, or a subprogram. Each of the procedures may process data provided from the outside and/or data generated by another procedure.

In some example embodiments, the RAM 2400 may include a volatile memory such as an SRAM, a DRAM, or the like.

The storage device 2600 may be substantially the same as the storage device 1200 in FIG. 4. For example, the storage device 2600 may store the program PR, and may store a first library L1, a second library L2, a standard cell library SCL and a design rule DR. The program PR or at least some elements of the program PR may be loaded from the storage device 2600 to the RAM 2400 before being executed by the processor 2100. The storage device 2600 may store a file written in a program language, and the program PR generated by a compiler or the like or at least some elements of the program PR may be loaded to the RAM 2400.

The storage device 2600 may store data, which is to be processed by the processor 2100, or data obtained through processing by the processor 2100. The processor 2100 may process the data stored in the storage device 2600 to generate new data, based on the program PR and may store the generated data in the storage device 2600.

In some example embodiments, the storage device 2600 may be a solid state drive (SSD). In other example embodiments, the storage device 2600 may be a universal flash storage (UFS), a multi-media card (MMC) or an embedded multi-media card (eMMC). Alternatively, the storage device 2600 may be one of a secure digital (SD) card, a micro SD card, a memory stick, a chip card, a universal serial bus (USB) card, a smart card, a compact flash (CF) card, or the like.

The I/O device 2200 may include an input device, such as a keyboard, a pointing device, or the like, and may include an output device such as a display device, a printer, or the like. For example, a user may trigger, through the I/O devices 2200, execution of the program PR by the processor 2100 or may provide various inputs, and may check the output data DO and the result data VR in FIG. 4, an error message, and/or the like.

The network interface 2300 may provide access to a network outside the system 2000. For example, the network may include a plurality of computing systems and communication links, and the communication links may include wired links, optical links, wireless links, or arbitrary other type links. Various inputs may be provided to the system 2000 through the network interface 2300, and the output data DO in FIG. 4 may be provided to another computing system through the network interface 2300.

Hereinafter, example embodiments will be described in detail based on an example in which the first simulation environment is the PGNET simulation environment and the second simulation environment is the RTL simulation environment.

Figure 6:
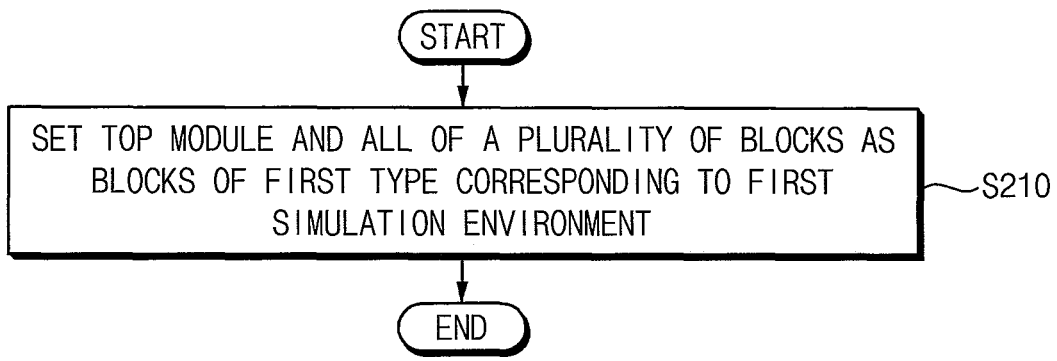
FIG. 6 is a flowchart illustrating an example of generating a first simulation environment in FIG. 1.
Figure 7:
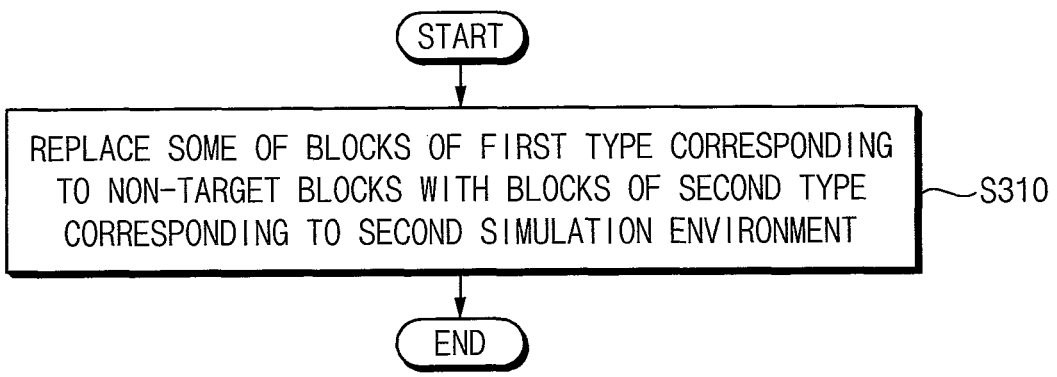
FIG. 7 is a flowchart illustrating an example of generating a second simulation environment in FIG. 1.
Figure 8:
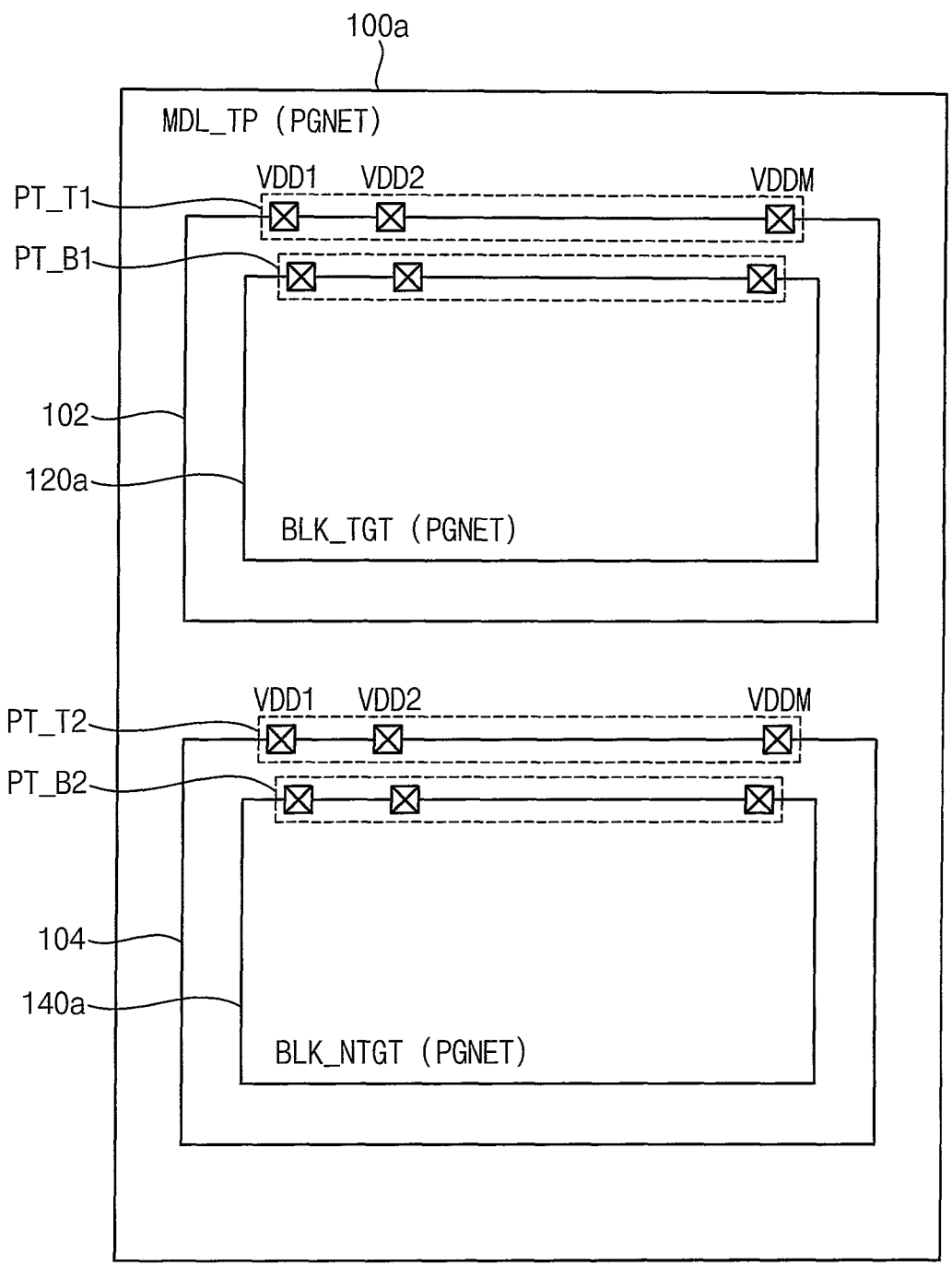
FIGS. 8 and 9 are diagrams for describing operations of FIGS. 6 and 7.
Figure 9:
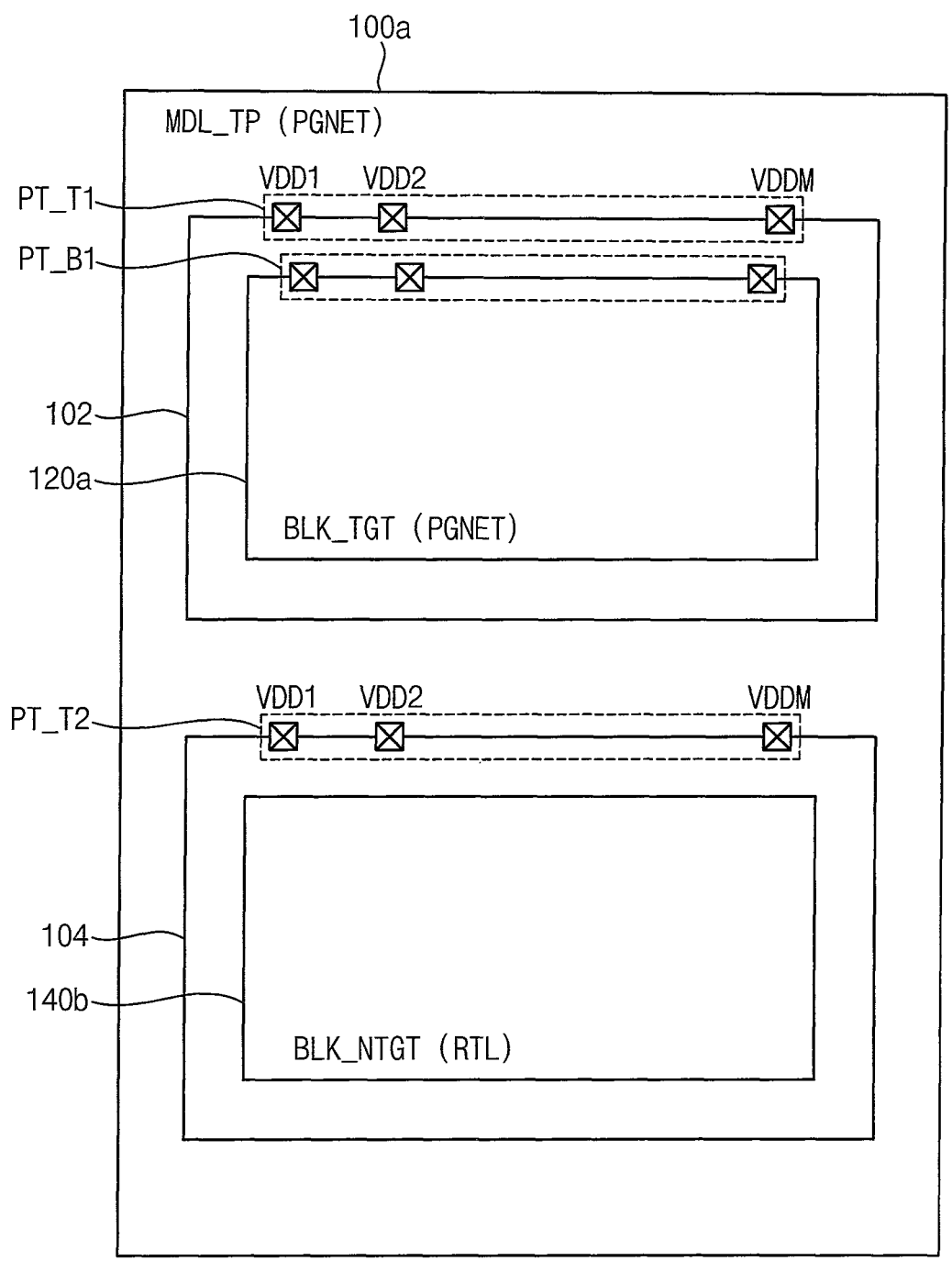

FIG. 6 is a flowchart illustrating an example of generating a first simulation environment in FIG. 1. FIG. 7 is a flowchart illustrating an example of generating a second simulation environment in FIG. 1. FIGS. 8 and 9 are diagrams for describing operations of FIGS. 6 and 7. FIGS. 8 and 9 illustrate an example in which the first simulation environment and the second simulation environment are generated for the semiconductor device 10 of FIG. 2.

Referring to FIGS. 1, 6 and 8, when generating the first simulation environment (S200), the top module and all of the plurality of blocks in the top module may be set as blocks of a first type corresponding to the first simulation environment (S210).

For example, as illustrated in FIG. 8, a top module MDL_TP may be set as a block 100a of the first type corresponding to the first simulation environment, a target block BLK_TGT (or the first block) may be set as a block 120a of the first type corresponding to the first simulation environment, and a non-target block BLK_NTGT (or the second block) may be set as a block 140a of the first type corresponding to the first simulation environment.

As described above, all of the top module MDL_TP, the target block BLK_TGT and the non-target block BLK_NTGT may be set as the blocks 100a, 120a and 140a of the first type. Thus, as described with reference to FIG. 3A, with respect to the blocks 100a, 120a and 140a of the first type corresponding to the top module MDL_TP, the target block BLK_TGT and the non-target block BLK_NTGT, power ports PT_T1, PT_T2, PT_B1 and PT_B2 may be generated, power switches and external power buffers may be inserted, and internal memory power may be connected. For convenience of illustration, FIG. 8 illustrates the power ports PT_T1 and PT_T2 included in the block 100a of the first type corresponding to the top module MDL_TP, the power port PT_B1 included in the block 120a of the first type corresponding to the target block BLK_TGT, and the power port PT_B2 included in the block 140a of the first type corresponding to the non-target block BLK_NTGT. In addition, domains 102 and 104 may represent domains of the top module MDL_TP including the power ports PT_T1 and PT_T2.

Further, the top module MDL_TP (e.g., the block 100a of the first type corresponding to the top module MDL_TP) and the target block BLK_TGT (e.g., the block 120a of the first type corresponding to the target block BLK_TGT) may be connected to each other via the power ports PT_T1 and PT_B1, and the top module MDL_TP (e.g., the block 100a of the first type corresponding to the top module MDL_TP) and the non-target block BLK_NTGT (e.g., the block 140a of the first type corresponding to the non-target block BLK_NTGT) may be connected to each other via the power ports PT_T2 and PT_B2. Power supply voltages VDD1, VDD2, . . . , VDDM may be provided from the top module MDL_TP to the target block BLK_TGT via the power ports PT_T1 and PT_B1, and the power supply voltages VDD1 to VDDM may be provided from the top module MDL_TP to the non-target block BLK_NTGT via the power ports PT_T2 and PT_B2. For example, the power ports PT_T1 and PT_T2 may be output power ports of the top module MDL_TP, and the power ports PT_B1 and PT_B2 may be input power ports of the target block BLK_TGT and the non-target block BLK_NTGT.

In some example embodiments, the first simulation environment may be the PGNET simulation environment, and the blocks 100a, 120a and 140a of the first type may be the PGNET blocks for the PGNET simulation. For example, when the gate level design is completed, each block may be described by logical connection and timing information using logic gates, and then the PGNET block may be generated by adding the power wiring information and the additional power-related information (e.g., the power port information, the power switch information, the external power buffer information, the memory power information, or the like) to each block. The PGNET block may have relatively complex structure and configuration, and thus time required for the simulation using the PGNET block may be relatively long.

Referring to FIGS. 1, 7 and 9, when generating the second simulation environment (S300), some of the blocks of the first type corresponding to the non-target blocks among the plurality of blocks may be replaced with blocks of a second type corresponding to the second simulation environment (S310).

For example, as illustrated in FIG. 9, with respect to the non-target block BLK_NTGT, the block 140a of the first type corresponding to the first simulation environment may be replaced with a block 140b of the second type corresponding to the second simulation environment. In other words, the non-target block BLK_NTGT may be reset as the block 140b of the second type corresponding to the second simulation environment. The top module MDL_TP and the target block BLK_TGT may be maintained as the blocks 100a and 120a of the first type.

In some example embodiments, the second simulation environment may be the RTL simulation environment, and the block 140b of the second type may be the RTL block for the RTL simulation. For example, the RTL block may be generated by converting and synthesizing each block into codes generated by the RTL coding and/or the netlist. For example, the RTL block may include only the codes without the power-related information. The RTL block may have relatively simple structure and configuration, and thus time required for the simulation using the RTL block may be relatively short.

In the method of verifying the semiconductor device according to example embodiments, the target block BLK_TGT may be set as the block 120a of the first type (e.g., the PGNET block), the non-target block BLK_NTGT may be set as the block 140b of the second type (e.g., the RTL block), and thus the hybrid simulation environment in which the first simulation environment (e.g., the PGNET simulation environment) and the second simulation environment (e.g., the RTL simulation environment) are combined may be implemented or generated. The accurate verification may be performed by setting the target block BLK_TGT as the block 120a of the first type, and the efficient and fast verification may be performed by setting the non-target block BLK_NTGT as the block 140b of the second type.

In some example embodiments, steps S210 and S310 may be sequentially performed. For example, step S210 may be performed first, and then step S310 may be performed.

Figure 10:
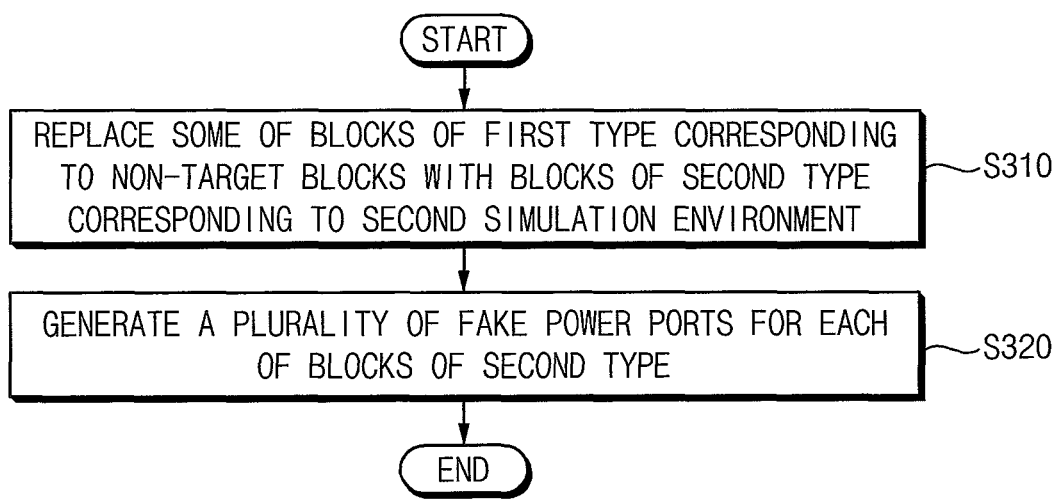
FIG. 10 is a flowchart illustrating another example of generating a second simulation environment in FIG. 1.
Figure 11:
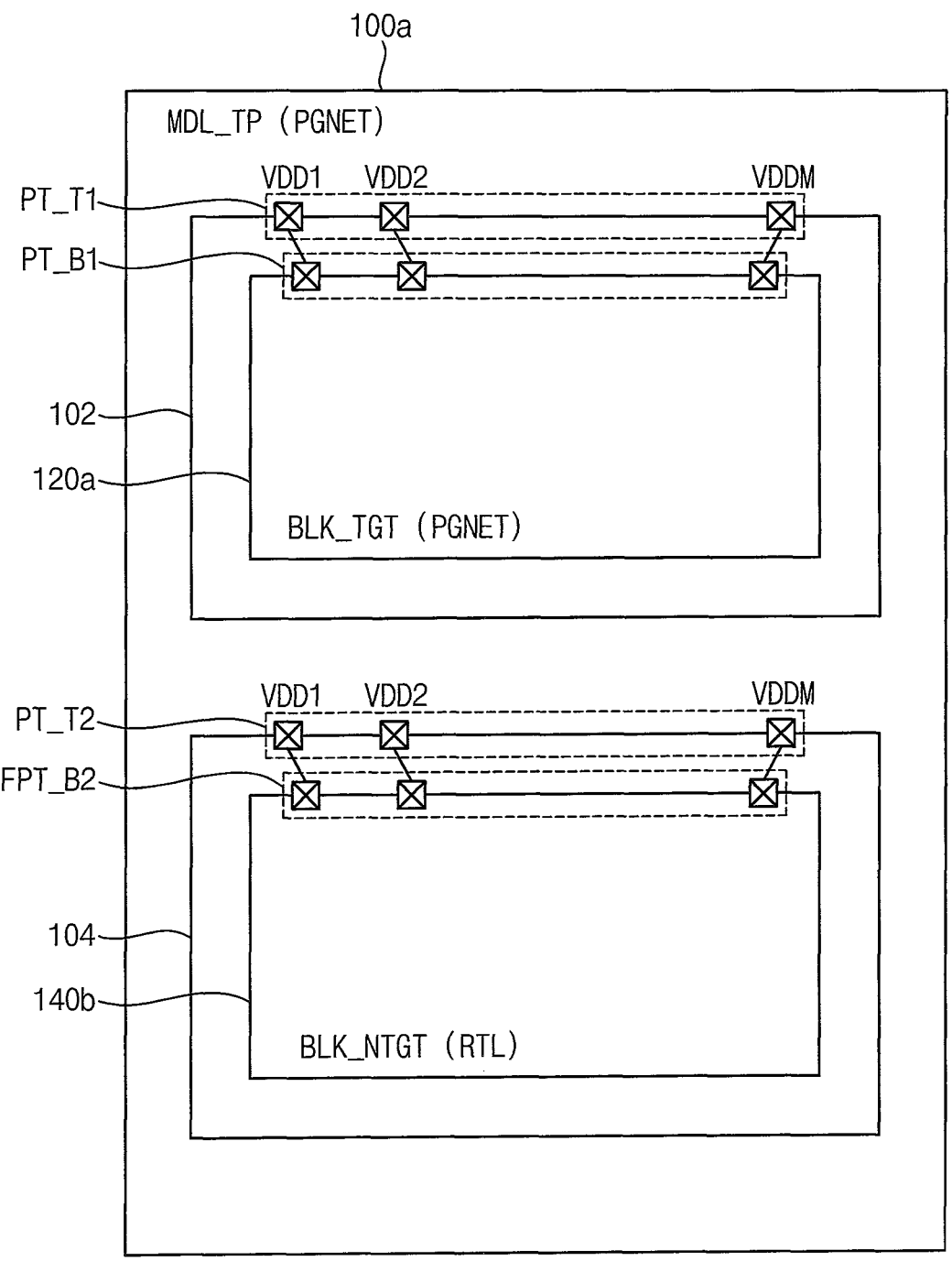
FIG. 11 is a diagram for describing an operation of FIG. 10.

FIG. 10 is a flowchart illustrating another example of generating a second simulation environment in FIG. 1. FIG. 11 is a diagram for describing an operation of FIG. 10. The descriptions repeated with FIGS. 7 and 9 will be omitted.

Referring to FIGS. 1, 10 and 11, when generating the second simulation environment (S300), step S310 may be substantially the same as step S310 in FIG. 7. A plurality of fake (or virtual) power ports may be generated for each of the blocks of the second type (S320).

For example, as illustrated in FIG. 11, with respect to the block 140b of the second type corresponding to the non-target block BLK_NTGT, fake power ports FPT_B2 may be generated. In addition, the top module MDL_TP (e.g., the block 100a of the first type corresponding to the top module MDL_TP) and the non-target block BLK_NTGT (e.g., the block 140b of the second type corresponding to the non-target block BLK_NTGT) may be connected to each other via the power ports PT_T2 and the fake power ports FPT_B2.

The fake power ports FPT_B2 may be used for the purpose of avoiding elaboration errors while the simulation is actually performed.

For example, when the non-target block BLK_NTGT is set as the block 140b of the second type (e.g., the RTL block) while the top module MDL_TP is set as the block 100a of the first type (e.g., the PGNET block), the power ports PT_T2 may exist in the top module MDL_TP, and the corresponding power ports may not exist in the non-target block BLK_NTGT. Thus, the elaboration errors may occur during elaboration for the simulation, and it may be impossible to proceed with the simulation. Accordingly, the power ports may be extracted from the UPF for the non-target block BLK_NTGT to generate the corresponding fake power ports FPT_B2, and the power ports PT_T2 and the corresponding fake power ports FPT_B2 may be connected to each other, thereby preventing the elaboration errors. A fake power port is a data structure which satisfies the syntax checking of the simulation tool when checking interfaces to the non-target block.

In some example embodiments, the plurality of fake power ports may be automatically generated. Since each block has dozens of power ports and the semiconductor device includes dozens of blocks, it may be difficult to manually generate the plurality of fake power ports, and thus a technique for automatically generating the plurality of fake power ports may be required.

For example, the program or tool for performing the method for verifying the semiconductor device according to example embodiments may be developed using python language. When the non-target block to be set as the RTL block is selected or applied before compiling in the PGNET simulation environment, the power port information of the non-target block may be automatically extracted from the UPF for the non-target block. The fake power ports may be automatically generated in the RTL block corresponding to the non-target block based on the automatically extracted power port information, and a new RTL file may be generated based on the automatically generated fake power ports in the RTL block. After that, when compiling the non-target block, the compiling may be performed using a newly generated RTL file (e.g., the RTL block having the fake power ports) instead of an existing RTL file.

Figure 12:
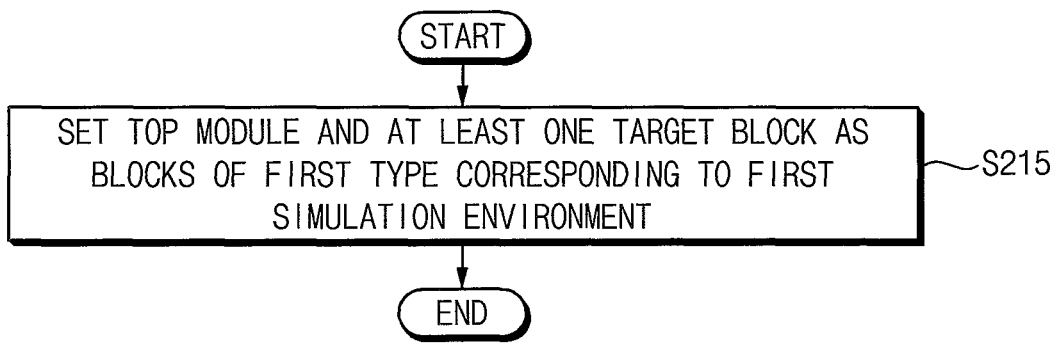
FIG. 12 is a flowchart illustrating another example of generating a first simulation environment in FIG. 1.
Figure 13:
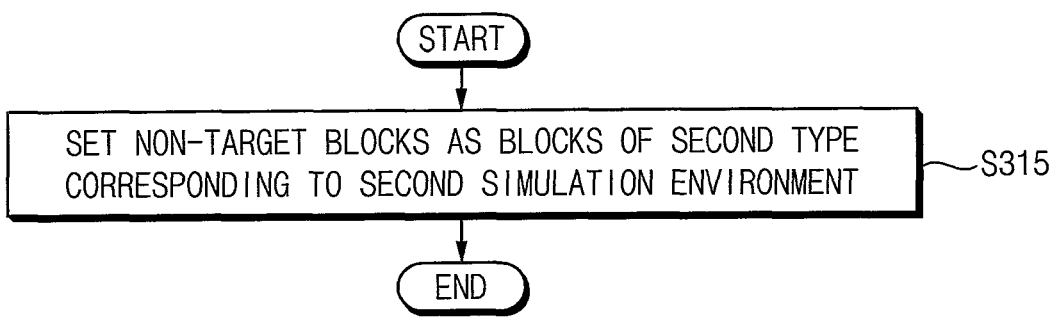
FIGS. 13 and 14 are flowcharts illustrating other examples of generating a second simulation environment in FIG. 1.
Figure 14:
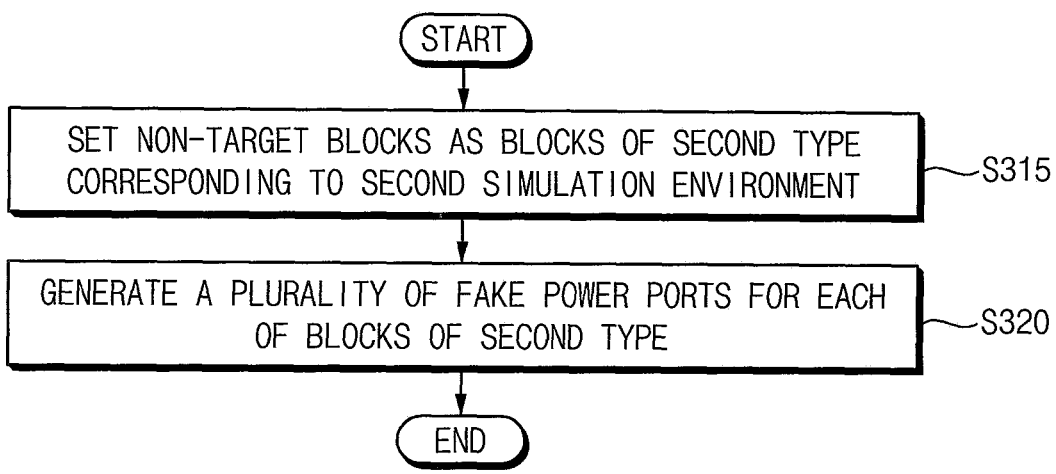

FIG. 12 is a flowchart illustrating another example of generating a first simulation environment in FIG. 1. FIGS. 13 and 14 are flowcharts illustrating other examples of generating a second simulation environment in FIG. 1. Descriptions for FIGS. 12-14 which are similar to FIGS. 6, 7 and 10 are omitted.

Referring to FIGS. 1 and 12, when generating the first simulation environment (step S200), the top module and the at least one target block may be set as blocks of a first type corresponding to the first simulation environment (S215).

Referring to FIGS. 1 and 13, when generating the second simulation environment (step S300), the non-target blocks may be set as blocks of a second type corresponding to the second simulation environment (S315).

In some example embodiments, steps S215 and S315 may be sequentially performed. For example, one of steps S215 and S315 may be performed first, and then the other of steps S215 and S315 may be performed. In other example embodiments, steps S215 and S315 may be substantially simultaneously performed.

After steps S215 and S315 are performed, the hybrid simulation environment may be implemented as illustrated in FIG. 9.

Referring to FIGS. 1 and 14, when generating the second simulation environment (S300), step S315 may be substantially the same as step S315 in FIG. 13, and step S320 may be substantially the same as step S320 in FIG. 10.

After steps S215, S315 and S320 are performed, the hybrid simulation environment may be implemented as illustrated in FIG. 11.

Figure 15:
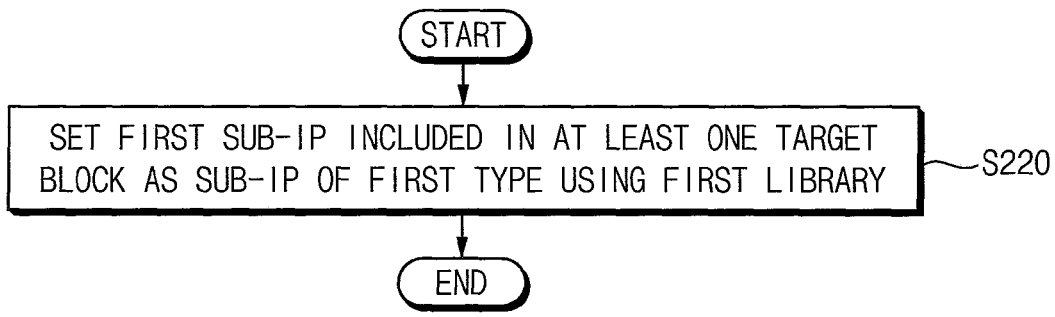
FIG. 15 is a flowchart illustrating still another example of generating a first simulation environment in FIG. 1.
Figure 16:
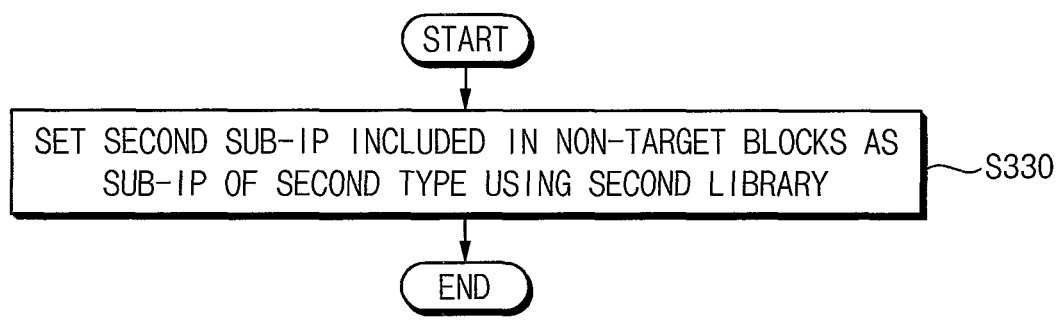
FIG. 16 is a flowchart illustrating still another example of generating a second simulation environment in FIG. 1.
Figure 17:
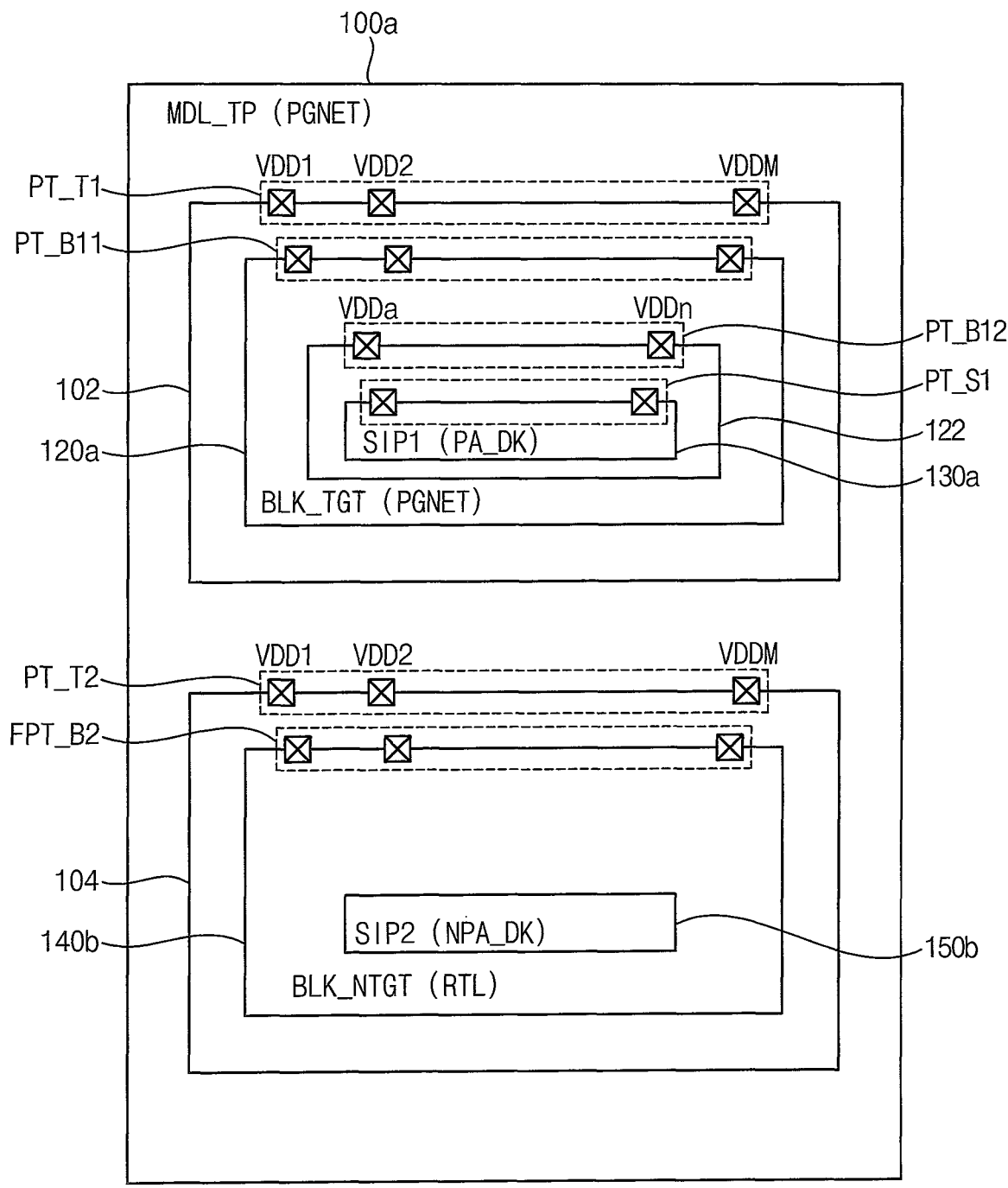
FIG. 17 is a diagram for describing operations of FIGS. 15 and 16.

FIG. 15 is a flowchart illustrating still another example of generating a first simulation environment in FIG. 1. FIG. 16 is a flowchart illustrating still another example of generating a second simulation environment in FIG. 1. FIG. 17 is a diagram for describing operations of FIGS. 15 and 16. Descriptions for FIGS. 15, 16, and 17 which are similar to those of FIGS. 6 through 10 will be omitted.

Referring to FIGS. 1, 15 and 17, when generating the first simulation environment (S200), a first sub-IP included in the at least one target block may be set as a sub-IP of a first type using a first library (S220). For example, step S220 may be performed after step S210 in FIG. 6 or step S215 in FIG. 12 is performed.

For example, as illustrated in FIG. 17, the target block BLK_TGT may include a first sub-IP SIP1. When step S210 or step S215 is performed, power ports PT_B11 and PT_B12 may be generated for the block 120a of the first type corresponding to the target block BLK_TGT. A domain 122 may represent a domain of the target block BLK_TGT including the power ports PT_B12.

After that, when step S220 is performed, the first sub-IP SIP1 may be set as a sub-IP 130a of the first type using the first library (e.g., the first library L1 in FIGS. 4 and 5). For example, the sub-IP 130a of the first type may include power ports PT_S1.

In addition, the target block BLK_TGT (e.g., the block 120a of the first type corresponding to the target block BLK_TGT) and the first sub-IP SIP1 (e.g., the sub-IP 130a of the first type corresponding to the first sub-IP SIP1) may be connected to each other via the power ports PT_B12 and PT_S1. Power supply voltages VDDa, . . . , VDDn may be provided from the target block BLK_TGT to the first sub-IP SIP1 via the power ports PT_B12 and PT_S1. For example, the power ports PT_B12 may be output power ports of the target block BLK_TGT, and the power ports PT_S1 may be input power ports of the first sub-IP SIP1.

In some example embodiments, the sub-IP 130a of the first type may include a power-aware design kit (PA_DK). For example, a design kit may represent a digital model of an analog IP included in the semiconductor device, and the power-aware design kit may be a design kit commonly used in the PGNET simulation environment and may have power ports. For example, the term "first type" in the block 120a of the first type and the term "first type" in the sub-IP 130a of the first type may not mean exactly the same type, but they may have a common feature in that they represents configurations that are capable of performing the power-aware simulation in the PGNET simulation environment.

Referring to FIGS. 1, 16 and 17, when generating the second simulation environment (S300), a second sub-IP included in the non-target blocks may be set as a sub-IP of a second type using a second library different from the first library (S330). For example, step S330 may be performed after step S320 in FIG. 10 or FIG. 14 is performed.

For example, as illustrated in FIG. 17, the non-target block BLK_NTGT may include a second sub-IP SIP2. When step S310 or step S315 is performed and step S320 is performed, the fake power ports FPT_B2 may be generated for the block 140b of the second type corresponding to the non-target block BLK_NTGT.

After that, when step S330 is performed, the second sub-IP SIP2 may be set as a sub-IP 150b of the second type by using the second library (e.g., the second library L2 in FIGS. 4 and 5). For example, the sub-IP 150b of the second type may not include power ports.

In some example embodiments, the sub-IP 150b of the second type may include a non-power-aware design kit (NPA_DK). For example, the non-power-aware design kit may be a design kit without power ports. For example, the term "second type" in the block 140b of the second type and the term "second type" in the sub-IP 150b of the second type may not mean exactly the same type, but they may have a common feature in that they represents configurations that are capable of performing the non-power-aware simulation (e.g., in the RTL simulation environment).

The sub-IP 150b of the second type may be used for the purpose of avoiding X propagation while the simulation is actually performed.

For example, even if the elaboration errors are avoided and/or prevented as described with reference to FIG. 11, the design kit may be used inside the non-target block BLK_NTGT set as the block 140b of the second type (e.g., the RTL block). When the power-aware design kit that is commonly used in the PGNET simulation environment and includes the power ports is used, the RTL block wrapping the power-aware design kit may not have internal power connections, and thus power may not be delivered to the power-aware design kit. In this case, the power-aware design kit that does not receive the power may not normally or properly operate, X signals may be propagated to the outside of power-aware design kit, the entire system may not normally operate due to the X signals, and it may be impossible to proceed with the simulation. An X signal is a variable value used by the design tool and indicates that the logic value is unknown. Generally, any comparison of an X signal with a benchmark value will indicate that the benchmark value was not produced during the simulation, and the simulation indicates a problem with the design.

Accordingly, the non-power-aware design kit may be applied or employed to the RTL block, and the power-aware design kit may be applied or employed to the PGNET block, thereby preventing the X propagation. For example, Verilog syntax may be used to solve the above-described problem. In the compiling stage, blocks may be compiled separately to form independent libraries. In the elaboration stage, the library for each block and the design kit required inside each block may be loaded or called while the verification environment for the semiconductor device is implemented or generated. In addition, it may be implemented, using a configuration command in Verilog, that the PGNET block automatically searches a necessary design kit in the first library (e.g., PA_DK library) and the RTL block automatically searches a necessary design kit in the second library (e.g., non-PA_DK library).

When using a simulation tool (e.g., the PGNET simulation tool) for performing the method of verifying the semiconductor device according to example embodiments, a user just needs to select the block to be set as the RTL block, and after that, the hybrid simulation environment may be automatically implemented in the program and environment.

Figure 18:
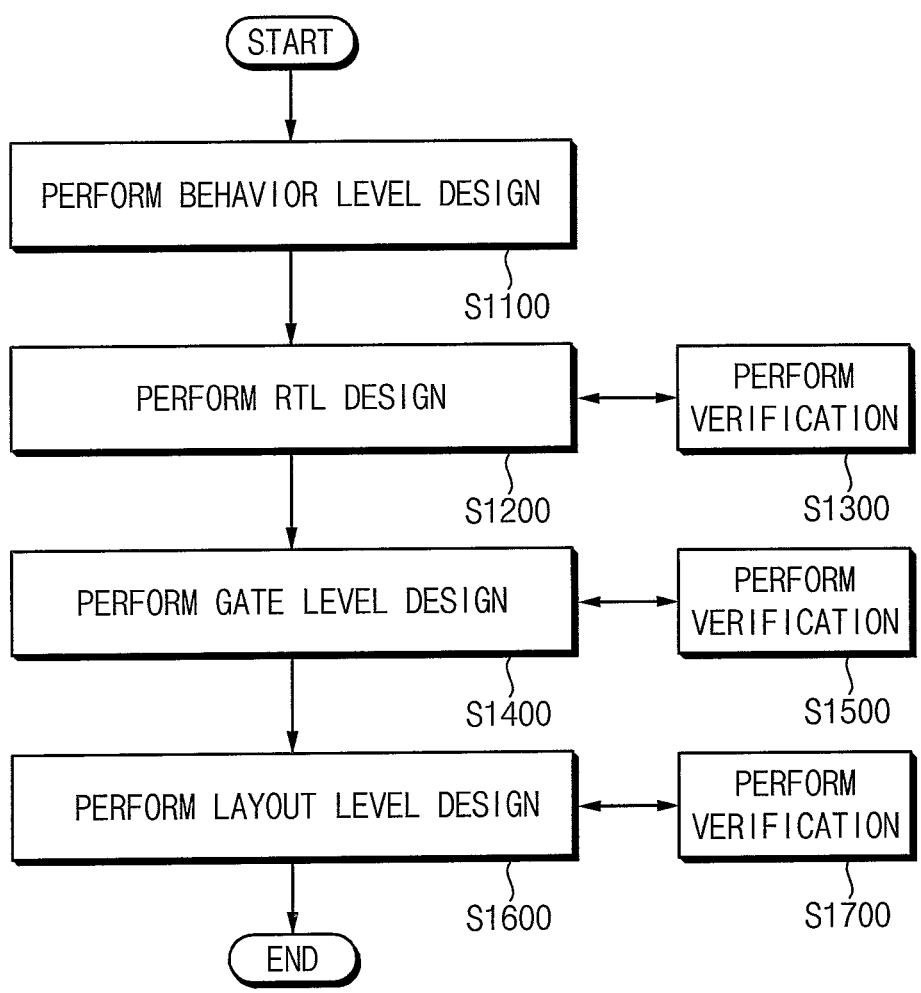
FIG. 18 is a flowchart illustrating a method of designing a semiconductor device according to example embodiments.

FIG. 18 is a flowchart illustrating a method of designing a semiconductor device according to example embodiments.

Referring to FIG. 18, in a method of designing a semiconductor device according to example embodiments, a behavior level design (or behavior level design process) corresponding to a functional design of the entire semiconductor device is performed first (step S1100).

The behavior level design may be referred to as an architecture design or a high level design (or high level design process). The high level design may represent that a semiconductor device to be designed or as a target device is depicted at an algorithm level and is described in terms of high-level computer language (e.g., C language).

Next, an RTL design (or RTL design process) of the semiconductor device is performed (S1200), and a verification is performed on the semiconductor device on which the RTL design is completed (S1300).

Devices and/or circuits designed by the high level design process may be more concretely described by an RTL coding or simulation in step S1200 and S1300. In addition, codes generated by the RTL coding may be converted into a netlist, and the results may be combined with each other to realize the entire semiconductor device. The combined schematic circuit may be verified by a simulation tool. In some example embodiments, an adjusting operation may be further performed in consideration of a result of the verification.

The RTL may be used for representing a coding style used in hardware description languages for effectively ensuring that code models may be synthesized in a certain hardware platform such as an FPGA or an ASIC (e.g., code models may be converted into real logic functions). A plurality of hardware description languages may be used for generating RTL modules. For example, the plurality of hardware description languages may include System Verilog, Verilog, VHDL, or the like.

In step S1300, the RTL simulation may be performed. The target of the RTL simulation may be the codes itself without timing information, and thus the RTL simulation may be performed quickly.

After that, a gate level design (or gate level design process) of the semiconductor device is performed (S1400), and a verification is performed on the semiconductor device on which the gate level design is completed (S1500).

The gate level design may represent that a semiconductor device is depicted using basic logic gates, such as AND gates and OR gates, and is described by logical connections and timing information of the logic gates. For example, all signals may be discrete signals and may only have a logical value of zero, one, X and Z (or high-Z).

In step S1500, a simulation for verifying static timing matching, dynamic timing matching, or the like, may be performed in consideration of timing-related information, and the PGNET simulation for verifying the power-related functions, features and/or characteristics may be performed in consideration of the power-related information. For example, the method of verifying the semiconductor device according to example embodiments described with reference to FIGS. 1 through 17 may be applied or employed while the PGNET simulation is performed, and thus the accurate, efficient and fast verification may be performed.

After that, a layout level design (or layout level design process) of the semiconductor device is performed (S1600), and a verification is performed on the semiconductor device on which the layout level design is completed (S1700).

The layout level design may be referred to as a physical design (or physical design process). The layout level design may be performed to implement or realize a logically completed semiconductor device on a silicon substrate. For example, the layout level design may be performed based on the schematic circuit prepared in the high level design or the netlist corresponding thereto. The layout level design may include a routing operation of placing and connecting various standard cells that are provided from a cell library, based on a predetermined design rule. For example, the standard cell library SCL and the design rule DR in FIGS. 4 and 5 may be used for the layout level design.

A cell library for the layout level design may contain information on operation, speed, and power consumption of the standard cells. In some example embodiments, the cell library for representing a layout of a circuit having a specific gate level may be defined in a layout design tool. Here, the layout may be prepared to define or describe shapes and sizes of patterns constituting transistors and metal interconnection lines, which will be actually formed on a silicon substrate. For example, layout patterns (e.g., PMOS, NMOS, N-WELL, gate electrodes, and metal interconnection lines thereon) may be suitably disposed to actually form an inverter circuit on a silicon substrate. For this, at least one of inverters defined in the cell library may be selected.

The term "standard cell" may refer to a unit of an integrated circuit in which a size of the layout meets a preset rule or criterion. The standard cell may include an input pin and an output pin and may process a signal received through the input pin to output a signal through the output pin. For example, the standard cell may include a basic cell such as an AND logic gate, an OR logic gate, a NOR logic gate, or an inverter, a complex cell such as an OR/AND/INVERTER (OAI) or an AND/OR/INVERTER (AOI), and a storage element such as a master-slave flip flop or a latch.

In addition, the routing operation may be performed on selected and disposed standard cells. In detail, the routing operation may be performed on the selected and disposed standard cells to connect them to upper interconnection lines. By the routing operation, the standard cells may be electrically connected to each other to meet a design.

Layout design schemes may be classified into a full custom type for manually performing a work according to a work type using a layout editor, an auto place & routing (P & R) type using an auto place/routing tool, and a semi-custom type using all of the above-described types.

In step S1700, a verification operation may be performed on the layout to check whether there is a portion violating the given design rule, after the routing operation. In some example embodiments, the verification operation may include evaluating verification items, such as a design rule check (DRC), an electrical rule check (ERC), and a layout vs schematic (LVS). The evaluating of the DRC item may be performed to evaluate whether the layout meets the given design rule. The evaluating of the ERC item may be performed to evaluate whether there is an issue of electrical disconnection in the layout. The evaluating of the LVS item may be performed to evaluate whether the layout is prepared to coincide with the gate level netlist.

Figure 19:
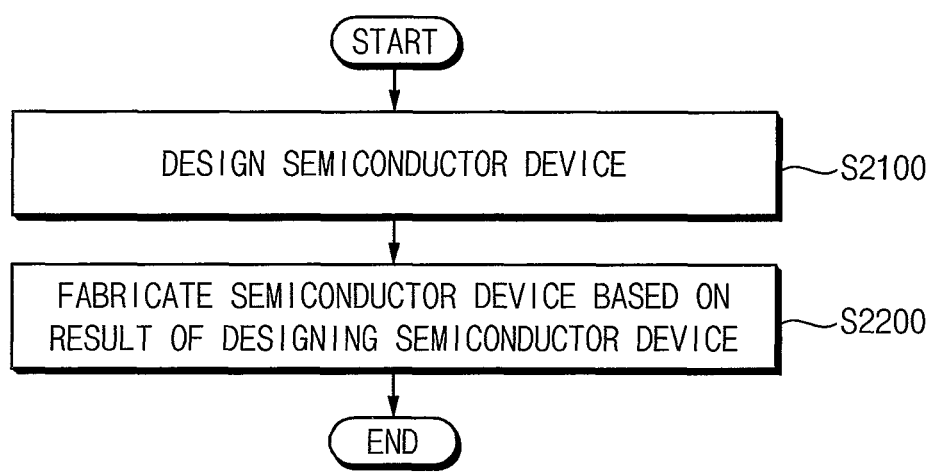
FIG. 19 is a flowchart illustrating a method of manufacturing a semiconductor device according to example embodiments.

FIG. 19 is a flowchart illustrating a method of manufacturing a semiconductor device according to example embodiments.

Referring to FIG. 19, in a method of manufacturing a semiconductor device according to example embodiments, the semiconductor device is designed (S2100), and the semiconductor device is fabricated based on a result of designing the semiconductor device (S2200). The designing operation in step S2100 may be performed based on the method of designing the semiconductor device according to example embodiments described with reference to FIG. 18.

In step S2200, the semiconductor device may be fabricated or manufactured by a mask, a wafer, a test, an assembly, packaging, and the like. For example, a corrected layout may be generated by performing optical proximity correction on the design layout, and a photo mask may be fabricated or manufactured based on the corrected layout. For example, various types of exposure and etching processes may be repeatedly performed using the photo mask, and patterns corresponding to the layout design may be sequentially formed on a substrate through these processes. Thereafter, the semiconductor device may be obtained in the form of a semiconductor chip through various additional processes.

Embodiments of the disclosure may include a system, method, computer program product, and a computer program product embodied in one or more non-transitory computer readable mediums having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

Embodiments of the disclosure may be applied to design various electronic devices and systems that include the semiconductor devices. For example, techniques provided herein may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of verifying a semiconductor device comprising a plurality of blocks, the method comprising:
receiving input data defining the semiconductor device;
generating a first simulation environment for a top module and at least one target block of the plurality of blocks in the top module, the first simulation environment including power wiring information and additional power-related information, the top module representing an entire structure of the semiconductor device;
generating a second simulation environment for non-target blocks of the plurality of blocks other than the at least one target block, the second simulation environment being different from the first simulation environment; and
performing a verification operation on the semiconductor device based on a hybrid simulation environment in which the first simulation environment and the second simulation environment are combined.

2. The method of claim 1, wherein the additional power-related information comprises at least one of power port information, power switch information, external power buffer information, and memory power information, and
the first simulation environment is a power-gating netlist (PGNET) simulation environment.

3. The method of claim 2, wherein the second simulation environment is a register transfer level (RTL) simulation environment without the additional power-related information.

4. The method of claim 1, wherein the generating the first simulation environment comprises setting the top module and all of the plurality of blocks in the top module as blocks of a first type corresponding to the first simulation environment.

5. The method of claim 4, wherein the generating the second simulation environment comprises replacing some of the blocks of the first type corresponding to the non-target blocks among the plurality of blocks with second blocks of a second type corresponding to the second simulation environment.

6. The method of claim 5, wherein the generating the second simulation environment further comprises generating a plurality of fake power ports for each of the blocks of the second type.

7. The method of claim 6, wherein the plurality of fake power ports are automatically generated.

8. The method of claim 6, wherein each of the blocks of the first type includes a plurality of power ports, and
the top module and the non-target blocks are connected to each other via the plurality of power ports and the plurality of fake power ports.

9. The method of claim 8, wherein the top module and the at least one target block are connected to each other via the plurality of power ports.

10. The method of claim 1, wherein the generating the first simulation environment comprises setting the top module and the at least one target block as blocks of a first type corresponding to the first simulation environment.

11. The method of claim 10, wherein the generating the second simulation environment comprises setting the non-target blocks as second blocks of a second type corresponding to the second simulation environment.

12. The method of claim 1, wherein each of the plurality of blocks includes at least one sub intellectual property (sub-IP), and
generating the first simulation environment comprises setting a first sub-IP included in the at least one target block as a sub-IP of a first type using a first library.

13. The method of claim 12, wherein the generating the second simulation environment comprises setting a second sub-IP included in the non-target blocks as a sub-IP of a second type using a second library that is different from the first library.

14. The method of claim 13, wherein the sub-IP of the first type includes a power-aware design kit (PA_DK), and
the sub-IP of the second type includes a non-power-aware design kit (NPA_DK).

15. The method of claim 1, wherein the semiconductor device is a system-on-chip (SoC).

16. A method of designing a semiconductor device including a plurality of blocks, the method comprising:
performing a gate level design of the semiconductor device; and
performing a first verification on the semiconductor device for which the gate level design is completed,
wherein performing the first verification comprises:
receiving input data defining the semiconductor device;
generating a first simulation environment for a top module and at least one target block of the plurality of blocks in the top module, the first simulation environment including power wiring information and additional power-related information, the top module representing an entire structure of the semiconductor device;
generating a second simulation environment for non-target blocks of the plurality of blocks other than the at least one target block, the second simulation environment being different from the first simulation environment; and
performing a verification operation on the semiconductor device based on a hybrid simulation environment in which the first simulation environment and the second simulation environment are combined.

17. The method of claim 16, further comprising:
performing a register transfer level (RTL) design of the semiconductor device; and
performing a second verification on the semiconductor device for which the RTL design is completed.

18. The method of claim 16, further comprising:
performing a layout level design of the semiconductor device; and
performing a second verification on the semiconductor device for which the layout level design is completed.

* * * * *